(12) United States Patent
Galvin (10) Patent No.: US 7,861,985 B2
(45) Date of Patent: Jan. 4, 2011

(54) HANDS-FREE DEVICE HOLDER FOR SECURING HAND-HELD PORTABLE ELECTRONIC DEVICE WITH A SCREEN

(76) Inventor: Nicolette A. Galvin, 202 Castle Garden St., Cary, NC (US) 27513

( * ) Notice: Subject to any disclaimer, the term of this patent is extended or adjusted under 35 U.S.C. 154(b) by 195 days.

(21) Appl. No.: 12/284,920

(22) Filed: Sep. 26, 2008

(65) Prior Publication Data

US 2010/0078536 A1    Apr. 1, 2010

(51) Int. Cl.
*F16M 13/00*    (2006.01)

(52) U.S. Cl. ............... 248/160; 248/176.3; 248/222.11; 248/309.1; 379/455; 455/575.1

(58) Field of Classification Search ................. 248/160, 248/122.1, 176.3, 407, 408, 409, 222.11, 248/222.12, 121, 128, 276.1, 309.1, 316.4, 248/176.1; 379/454, 455, 446, 486; 455/575.1, 455/569, 90
See application file for complete search history.

(56) References Cited

U.S. PATENT DOCUMENTS

| | | | | |
|---|---|---|---|---|
| 2,597,670 | A | 5/1952 | Pinto | 379/447 |
| 2,702,836 | A | 2/1955 | Duncan | 379/454 |
| 2,961,498 | A | 11/1960 | Snow | 379/448 |
| 3,757,363 | A | 9/1973 | Langlas | 5/503.1 |
| 4,320,883 | A | 3/1982 | Bass | 248/104 |
| 4,630,185 | A | 12/1986 | Copeland | 362/427 |
| 4,842,174 | A | * | 6/1989 | Sheppard et al. | 224/548 |
| 4,846,434 | A | 7/1989 | Krogsrud | 248/284.1 |

(Continued)

FOREIGN PATENT DOCUMENTS

DE    19520502    12/1996

(Continued)

OTHER PUBLICATIONS

"TNB ACGPVELO36136 Boat and Bike Universal Support" at http://www.pixmania.co/uk/uk/uk/575225/art/tnb/acgpvelo36136-boat-and-bi.html.

(Continued)

*Primary Examiner*—Terrell Mckinnon
*Assistant Examiner*—Todd M. Epps
(74) *Attorney, Agent, or Firm*—Ernest D. Bluff & Associates, LLC; Ernest D. Buff; Margaret A. LaCroix (57) ABSTRACT

A hands-free electronic device holder for holding handheld electronic devices with a screen at or below the user's eye level at a typical distance of 20 to 30 cm is provided. The handheld electronic device is selected from MP3 players, video players, cell phones, PDAs, GPS units or other screen containing devices that display images or interacts with the user via software generated buttons. The hands-free device holder has a flexible adjustable gooseneck, the proximal end of which carries a tab having two spring pins that securely engage with a pocket member. A securement attachment means secures the pocket member to the backside of the handheld electronic device, and two lateral slots receive the pins. The distal end of the flexible adjustable gooseneck connects to a spring clip similar to a clothes line pin, which attaches the hands-free electronic device holder to an airline dining tray or a worktable.

12 Claims, 6 Drawing Sheets

U.S. PATENT DOCUMENTS

| | | | |
|---|---|---|---|
| 4,854,538 A | 8/1989 | Von Schalscha | 248/346.03 |
| 5,033,528 A | 7/1991 | Volcani | 160/351 |
| 5,083,732 A | 1/1992 | Akamine | 248/104 |
| 5,192,041 A | 3/1993 | Bryant | 248/104 |
| 5,699,988 A * | 12/1997 | Boettger et al. | 248/122.1 |
| 5,762,306 A | 6/1998 | Day | 248/274.1 |
| 5,881,983 A | 3/1999 | Hofmann et al. | 248/274.1 |
| 5,903,645 A * | 5/1999 | Tsay | 379/455 |
| 5,937,537 A | 8/1999 | Miller | 34/97 |
| 5,988,572 A * | 11/1999 | Chivallier et al. | 248/176.1 |
| 6,032,910 A * | 3/2000 | Richter | 248/274.1 |
| 6,142,486 A | 11/2000 | Cedarberg | 297/103 |
| 6,157,163 A | 12/2000 | Blackwood | 320/115 |
| 6,357,710 B1 | 3/2002 | Fielden et al. | 248/276.1 |
| 6,434,237 B1 | 8/2002 | Murray | 379/446 |
| 6,481,688 B1 | 11/2002 | Welling et al. | 248/694 |
| 6,698,044 B2 | 3/2004 | Greenfield et al. | 5/624 |
| 6,799,356 B2 | 10/2004 | Sanchez | 29/284 |
| 6,840,485 B2 * | 1/2005 | Richter | 248/311.2 |
| D502,956 S * | 3/2005 | Holmes et al. | D16/242 |
| D521,990 S | 5/2006 | Richter | D14/253 |
| 7,136,280 B2 | 11/2006 | Jobs et al. | 361/681 |
| 7,292,881 B2 | 11/2007 | Seil et al. | 455/575.1 |
| 7,320,450 B2 * | 1/2008 | Carnevali | 248/160 |
| 2006/0108485 A1 | 5/2006 | Enderle | 248/160 |
| 2006/0253109 A1 | 11/2006 | Chu | 606/1 |
| 2007/0164987 A1 | 7/2007 | Graham | 345/156 |
| 2008/0051160 A1 * | 2/2008 | Seil et al. | 455/575.1 |

FOREIGN PATENT DOCUMENTS

| | | |
|---|---|---|
| JP | 4039497 | 2/1992 |
| JP | 5115534 | 5/1993 |
| JP | 10078194 | 3/1998 |
| JP | 2006/119554 | 5/2006 |
| WO | WO 92/21911 | 12/1992 |

OTHER PUBLICATIONS

"LED One Light Gooseneck Reading lamp with Clamp in Polished Steel" at http://www.pixmania.co/uk/uk/uk/575225/art/tnb/acgpvelo36136-boat-and-bi.html.

"Panavise Univeral Eletronic Device" at http://www.pricecheck.co.za/offers/663382/Panavise+Univeeral+Electtronic+Device+(ipo/.

"Macally IceCam Portable Goose Neck USB video web camera" at http//www.allmacshop.co.uk/?page=proddetail&prod=19031.

"ARKON—SF-249_Portable DVD Flexible Gooseneck Mount" at http://www.eletronicsoutfitter.com/sf-240/arkon/p137394.html.

* cited by examiner

Fig. 1

PRIOR ART

PRIOR ART

Fig. 2b

PRIOR ART

Fig. 2c

PRIOR ART

HANDS-FREE DEVICE HOLDER FOR SECURING HAND-HELD PORTABLE ELECTRONIC DEVICE WITH A SCREEN

BACKGROUND OF THE INVENTION

1. Field of the Invention

The present invention relates to a hands free device for holding electronic articles such as video MP3 players, mobile telephones and PDAs while traveling in an airplane or using a workbench. These devices typically comprise a view screen and software generated control buttons. For proper interactivity with the user, the electronic articles are preferably located at eye level or lower, creating a distance of 20 to 30 centimeters between the eye and the screen.

2. Description of the Prior Art

A number of device holders secure articles such as a work lights, MP3 music players or cell phones to various locations, including a user's belt and the like. These securing devices typically use clips, clamps, belts and the like that secure the device to a belt or strap around the arm, for example.

U.S. Pat. No. 2,597,670 to Pinto discloses a telephone switch and hook activator. The telephone is clamped onto a flexible or a screw member and the distal end of the flexible or screw threaded member is attached to the end of the table using securing clamps. The location of the telephone may be adjusted by bending the flexible member. Alternatively, the height of the telephone above the table may be increased by elongating the screw threaded member. This telephone holder does not secure a hand-held electronic device with a screen at or below the user's eye level. Since the securing clamp attaches the telephone to a flexible member, it surrounds the telephone, causing the viewing area of the device to be partially covered. A thin slender electronic device may not be easily captured by a clamp of the kind used in the '670 device.

U.S. Pat. No. 2,702,836 to Duncan discloses a telephone holder. The flexible gooseneck of the telephone holder is attached to a handset using a clamp. The gooseneck is not attached to a hand-held electronic device with a screen at the eye level or lower of a user using universal belt buckle connection means. The other end of the flexible gooseneck is attached to the table on which the telephone is placed and therefore does not have a clip for attachment to a flat sheet such as an airplane dining tray or a worktable.

U.S. Pat. No. 2,961,498 to Snow discloses a telephone switch control device. The flexible gooseneck of the telephone holder is attached to a handset using a clamp. The gooseneck is not attached to a hand-held electronic device with a screen at the eye level or lower of a person using universal belt buckle connection means. The other end of the flexible gooseneck with the head set is attached to the table on which the telephone is placed and therefore does not have a clip for attachment to a flat sheet such as an airplane dining tray or a worktable.

U.S. Pat. No. 3,757,363 to Langlas discloses a patient communicator support. A clamp means adapted to be clamped onto a hospital bed or other patient's bed has a bendable arm holding a cradle for supporting a communication instrument in various adjusted positions. The arm is adapted for juxtaposition relative to the patient in accordance with his desire. This device holds a patient communication device. It does not hold a hand-held electronic device having a screen; the electronic device is not held at or below the eye level of a user. The patient communication device is held by a padded cradle, which can be quite heavy. The patient communication holder has a bendable arm made from convoluted metal, which retains shape by friction and does not have a gooseneck. The patient communication holder is attached to a bed frame by a C-clamp and is not readily attached to a flat sheet such as an airplane dining tray or work table.

U.S. Pat. No. 4,320,883 to Bass discloses a positionable toy/bottle holder. This baby bottle holder is attached to a table, high chair, baby carriage, stroller, buggy, or crib using a C clamp; it is not readily attached to a flat sheet such as an airplane dining tray or a work table. The positionable toy/bottle holder is integrally attached to a baby bottle holding ring member and cannot be attached to a hand-held electronic device with a screen at or below the eye level of a user. The swing arm that is pivoted is not a gooseneck that can be adjusted both in height as well as positioned in a selected three dimensional location.

U.S. Pat. No. 4,630,185 to Copeland discloses a mechanical arm with two link members. This mechanical arm has a free end that can be positioned in an almost infinite number of locations relative to a fixed end. The mechanical arm may be used as a free position lamp. The arm is free standing in the location without the use of counter balance or springs. The arm comprises a fixed end base and a free end portion with a pair of spaced apart separate link members therebetween. The gooseneck connecting the lamp to the base has two link members provided with a plurality of rigid elements and flexible elements. This is not a conventional one link member. The mechanical arm is integrally connected to a lamp and is not designed to attach to a hand-held electronic device with a screen at the eye level or lower of a user. There is no universal belt buckle attachment to a display containing an electronic device.

U.S. Pat. No. 4,842,174 to Sheppard et al. discloses a flexible mount for mobile apparatus. This flexible mount for mobile apparatus is mounted on the floor or sidewall of a mobile vehicle and carries electronic or other equipment at the other end through a coiled helical flexible coil. The electronic or other equipment is screwed into the flexible element. The electronic equipment is not a hand-held electronic device with a screen at or below the eye level of a user and is not attached to a flexible gooseneck through a universal belt buckle attachment.

U.S. Pat. No. 4,846,434 to Krogsrud discloses a counterbalanced arm assembly. This assembly does not have a gooseneck, rather has rigid upper and lower arms which are elongated tubular sections that are pivoted. The assembly does not hold a hand-held electronic device with a screen at or below the eye level of a user, but rather holds heavy objects, such as a television, due to the spring support and a counterbalance weight.

U.S. Pat. No. 4,854,538 to Von Schalscha discloses an appliance mounting device. The articulated member, which connects the support element to the tray support, is not a gooseneck. The device supports a computer or a television, a substantially heavy object rather than a hand-held electronic device with a screen at or below the eye level of a user. The supported object, such as a computer or a television, is merely placed on the support tray and is not held in place by the use of a universal belt buckle connection.

U.S. Pat. No. 5,033,528 to Volcani discloses a personal portable sunshade. This personal portable sunshade comprises a disc having sufficient surface area for shading a particular portion of a user's body. A clip is used to attach the personal portable sunshade to a suitable location while other means of attachment may be used. The clip has a rigid tube connected to it which attaches to a flexible member that integrally carries the sunshade which may be oriented to a desired location blocking the rays of the sun. The device does not have universal belt buckle connection means to attach to a hand-held electronic device with a screen at or below the eye level of a user. Moreover, the gooseneck does not extend from the clip to the sunshade providing easy adjustment of height and location, since the rigid tube limits possible height adjustment of the sunshade.

U.S. Pat. No. 5,083,732 to Akamine discloses a flexible baby bottle holding animal. This baby bottle holder is specifically for use in feeding and storing the baby's food. It also facilitates an easy reach by the baby and provides other functions. It has a bottle gripping ring-like plastic structure connected to a flexible plastic rod. Since the ring structure is permanently attached to the flexible plastic rod, it is not available for supporting a hand-held electronic device with a screen at or below the eye level of a user. Besides, the flexible plastic rod is not a gooseneck that can be flexed and held in place at a plurality of locations.

U.S. Pat. No. 5,192,041 to Bryant discloses a baby bottle holder. This baby bottle holder has a bottle securing means that includes a VELCRO or buckle attachment that is integrally attached to a flexible member such as a gooseneck. The baby bottle holder does not attach to a hand-held electronic device with a screen at or below the eye level of a user and is not held by a universal belt buckle securing means.

U.S. Pat. No. 5,699,988 to Boettger et al. discloses a coupler clamping apparatus for interconnecting a free-standing, wheeled intravenous pole with mobile patient transfer devices. The coupler has a first end attachable to a pole or a wheelchair using a C clamp with adjustable jaw opening. The second end carries a transfer device, which may couple to a plurality of patient specific devices as the patient is wheeled from one place to another using a wheel chair. The transfer device is not a universal belt buckle attachment and the coupler does not removably connect to a hand-held electronic device with a screen at or below the eye level of a user.

U.S. Pat. No. 5,762,306 to Day discloses a snake-like tubing support for a computer track ball pointing device. The snake like tubing, which is the gooseneck, has a central aperture through which the connecting wire for a mouse, trackball or keyboard passes through. The gooseneck is flexed to maintain the position of the wire. The gooseneck is not removably attached by a universal belt buckle means to a hand-held electronic device with a screen at or below the eye level of a user.

U.S. Pat. No. 5,881,983 to Hoffmann et al. discloses a hair dryer positioning system. This hair dryer positioning system includes a detachable, bendable, shape retaining, dryer positioning arm. Such an arm has a connecting fitting at a bottom end thereof and a flexible dryer cradle member with securing straps at a top end thereof; a hollow, dome-shaped base cover member with a connecting bracket at the top center thereof that is mateable with the connecting fitting of the positioning arm. It uses a gooseneck that is attached to an integral cannel shaped hair dryer cradle provided with a pair of hook and loop fasteners. The hair dryer positioning system does not removably attach to a hand-held electronic device with a screen at the eye level or lower of a user using universal belt buckle connecting means.

U.S. Pat. No. 5,937,537 to Miller discloses a combination hair dryer and stand. This stand for a hair dryer includes a base, an adjustable neck and a clamp for gripping the dryer. With the dryer inserted into the clamp, a dryer nozzle is directed in a preferred direction by adjusting the neck of the stand. This combination hair dryer stand includes an adjustable gooseneck with one end permanently connected to a base that rests on the ground. The base does not have a spring assisted clamp. The other end of the gooseneck is permanently connected to a C-clamp device that clamps the spine portion of the dryer. The gooseneck is not removably attached to a hand-held electronic device with a screen at or below the eye level of a user by universal belt buckle connection means.

U.S. Pat. No. 6,142,486 to Cedarberg discloses a mounting arrangement for retainer collet assembly. The assembly is a combination of a flexible arm with a collet assembly. This assembly has a gooseneck covered with a shroud, one end of which is permanently attached to a collect for receiving a variety of tools such as magnifying glass, etc. The other end of the gooseneck is attached to prong and socket coupling device which is appointed to be attached to a retaining location. The gooseneck is not removably attached to a hand-held electronic device with a screen at the eye level or lower of a user using universal belt buckle attachment means. The other end of the gooseneck is not attached to a spring-loaded clip.

U.S. Pat. No. 6,157,163 to Blackwood discloses an automobile charging unit for a pager. An adapter portion is dimensioned for being received within a standard cigarette lighter socket of a vehicle. The adapter portion has contacts thereon for mating with charging contacts within the cigarette lighter socket. A flexible neck portion extends outwardly from an outer end of the adapter portion. A pivot ball joint is secured to an outer free end of the flexible neck portion. The charger unit plugs into a car cigarette lighter socket and charges a pager. The flexible portion of the device is short and only provides limited adjustability. The device does not attach to a hand-held electronic device with a screen at or below the eye level of a user.

U.S. Pat. No. 6,357,710 to Fielden et al. discloses an item holding device. This item holding device has a multi-segmented arm wherein each segment is connected to each adjacent segment by a swivel joint providing a substantial fictional resistance to motion. The device has a flexible arm that holds its shape by frictional engagements of plastic links of the flexible member. The flexible arm has two clothes line like clamps affixed to the ends. The device attaches to an automobile trunk or other action-site with one clamp while the other clamp attaches to an umbrella or flashlight. The clamps are spring-loaded. The flexible arm does not have universal belt buckle attachment means to secure a hand-held electronic device with a screen at or below the eye level of a user to a flexible gooseneck.

U.S. Pat. No. 6,434,237 to Murray discloses an electronic device support containing rheological material with controllable viscosity. The flexible element in this device is a plastic material with a rheological fluid that stiffens when electromagnetic field is applied. This is not a standard gooseneck and requires a certain level of electrical current to hold its position. One end of the flexible element is connected to a cigarette lighter socket and its other end is connected to a radio telephone speaker for hands free operation.

U.S. Pat. No. 6,481,688 to Welling et al. discloses a hospital bed communication and control device. This communication and control device attaches to the head end of a hospital bed for positioning a voice activated communication and control module adjacent a patient's head. The device arm has three segments only one (10) of which is flexible and the plurality of arms do not function as a gooseneck. One end of the arm is connected to the head end of a bed while the other end is connected to a communication and control device. The flexible end of the arm is not connected to an Ipod or Iphone using universal belt buckle securing means.

U.S. Pat. No. 6,698,044 to Greenfield et al. discloses a pediatric stirrup device and method. The medical stirrup device includes a base adapted for fixed securement to an associated support member. The device includes a gooseneck shaft member having a proximal end connected to the base and a distal end spaced from the base. The gooseneck shaft member is selectively manually bendable by an end-user into a curvilinear operative shape between an unbent linear position and a bendable limit of the gooseneck shaft member. A fastener is located at the distal end of the gooseneck shaft member. The pediatric stirrup has a flexible gooseneck shaft that attaches to a side rail of a hospital bed and the other end carries a pediatric stirrup that hangs a patient's limb. The gooseneck shaft is not attached to a hand-held electronic device with a screen at or below the eye level of a user and does not have universal belt buckle attachment means.

U.S. Pat. No. 6,799,356 to Sanchez discloses a screw/insert saver. A machine having a machine tool is connected to manually manipulatable fastening members. A fastening member receiving and retaining device is placed beneath the machine tool for catching fastening members when inadvertently dropped. A screw or insert catching bag or a pan is suspended at a location for catching fallen objects. The bag is held in place by a flexible hose wherein one end of the hose is connected to a machine and the other end is connected to the grab bag. The flexible hose does not connect to a hand-held electronic device with a screen at or below the eye level or lower of a user, and the connection means is not a universal belt buckle connection.

U.S. Pat. No. 7,136,280 to Jobs et al. discloses a computer controlled display device. The display device includes a flat panel display having an input for receiving display data. Additionally, a moveable assembly may be coupled to the display. The moveable assembly may provide at least three degrees of freedom of movement for the flat panel display device. Additionally, the moveable assembly may have a cross-sectional area, which is substantially less than a cross-sectional area of a display structure of the flat panel display. Additionally, the moveable assembly may include a plurality of stacked ball-and-socket assemblies. This is an electrically controlled monitor positioning device wherein the position of the monitor is controlled by a tension cable. The flexible element is not manually movable. One end of the flexible element is connected to the base while the other end is connected to a monitor. The end of the flexible element is not connected to a hand-held electronic device with a screen at or below the eye level of a user and the connection means does not include universal belt buckle attachment means.

U.S. Pat. No. 7,320,450 to Cameyali discloses a configurable mounting apparatus. This multiply configurable mounting apparatus has an elongated permanently bendable support leg with a support base coupled to a first end of the support leg. The support base is structured for securing the mounting apparatus relative to an external surface. A mounting platform is coupled to a second end of the support leg opposite from the first end. The mounting platform is structured for mounting an external device to the second end portion of the permanently bendable support leg. The support leg is not a gooseneck and is bendable only once, creating a permanently bent configuration. The only adjustment available thereon is the multiply positionable platform whose physical location is no longer changeable. The configurable mounting apparatus does not connect to a hand-held electronic device with a screen at or below the eye level of a user using a universal belt buckle connecting means.

U.S. Pat. No. 7,292,881 to Seil et al. discloses a holder, electrical supply, and RF transmitter unit for electronic devices. This holder, electrical supply, and optional RF transmitter unit holds and supplies power to the electronic device. The RF transmitter receives a data signal from an operating electronic device when the device (e.g., MP3 player) is held in the unit. Electrical power enters the unit's power acquisition portion (e.g., cigarette lighter adapter) from an external source and flows to the electronic device via the holder. A data signal from the electronic device is processed by an RF transmitter in the unit, and the resulting RF signal is broadcast by an antenna (e.g., gooseneck) that preferably forms a repositionable mechanical connection between the holder and the power acquisition unit. Due to the electrical connection requirements to the RF transmitter, this holder has to be connected to a cigarette lighter and the overall position of the Ipod will be well below the eye level or lower of the user. Besides, the holder cannot be attached to an airline dinner tray or a workbench.

U.S. Design Pat. No. D521,990 to Richter discloses an electronic instrument support system. The system appears to have a bendable gooseneck with a rubber mounting cup at one end and a slidable cradle for supporting an electronic instrument which may be slid up or down. The electronic instrument is supported in a slidable cradle and a hand-held electronic device with a screen at or below the eye level of a user is not attached by universal belt buckle connecting means.

U.S. Patent Application Publication No. 2005/0040192 to Steven, III et al. discloses a belt clip attachment device and method of use. This method involves connecting a belt clip attachment device to a personal electronic device such as a mobile phone. The connection between a mobile phone and a belt clip is accomplished by a belt clip attachment device that connects to the rear side of the mobile phone through a push and twist action of the knob on the belt clip attachment device. The belt clip attachment attaches a mobile phone to a belt. The mobile phone is attached in the back using a screw in fixture, not a universal belt buckle connection means. No gooseneck is comprised by this device.

U.S. Patent Application Publication No. 2006/0108485 to Enderle discloses a flexible self-supporting camera mount. The mount is a small, lightweight, durable camera mounting device utilizing a flexible yet rigid shaft to securely self-support a camera for hands-free operation. The mount is screwed at one end into the aperture at the bottom of a camera. The flexible shaft wire element is wrapped around various objects to support the camera functioning as a free standing mount. The camera mount does not attach to a hand-held electronic device with a screen at or below the eye level of a user using universal belt buckle connection means. It also does not have a clip for attachment to a flat sheet at the other end of the flexible shaft.

U.S. Patent Application Publication No. 2006/0253109 to Chu discloses a surgical robotic helping hand system. This device has a plurality of surgical instruments clamped to a plurality of gooseneck extender portions that is attached to a ring like member located adjacent to a surgical table. The gooseneck is not attached to a hand-held electronic device with a screen at or below the eye level of a user. Attachment is not accomplished using universal belt buckle connecting means. The device does not have a clamp at the other end of a gooseneck for attachment to a flat sheet.

U.S. Patent Application Publication No. 2007/0164987 to Graham discloses an apparatus for hands-free support of a device in front of a user's body. This apparatus supports an electronic device in front of the body of a user. This device supports a device by having a chest support, two arm supports and a device-support assembly. The device-support assembly is not indicated to be a gooseneck. The device-support assembly is attached to chest support and is not a clip that may be attached to a flat surface such as an airplane dining tray or work table etc.

Foreign Patent Application Publication No. WO92/21911 to Kloss Ralf discloses a rod like holder for a plurality of medical measuring and/or delivery systems. One end of the holder has a clamp for attachment to medical measuring or delivery systems while the other end is a clamp designed for attachment to a tubular object such as a bedstead. The first end of the device does not attach to a delicate surface of a handheld electronic device with a screen at or below the eye level of a user. The other end does not attach to a flat sheet such as an airplane dining tray or a worktable.

Foreign Patent Application Publication No. JP4039497 to Nakada Kazuhisa discloses a flexible shaft. The flexile shaft has no attachment means to a hand-held electronic device with a screen at or below the eye level of a user. No attachment is provided to a flat sheet of an airplane dining tray or worktable.

Foreign Patent Application Publication No. DE19520502 to Luenig Helmar discloses a car photography lamp holder. The lamp grabbing end cannot be used to secure a hand-held electronic device with a screen at the eye level or lower of a user.

Foreign Patent Application Publication No. JP5115534 to Iechi discloses a feeding bottle holder. The circular pincer like clams grab a baby feeding bottle and cannot be used to secure a hand-held electronic device with a screen at the eye level or lower of a user. This structure is very similar to U.S. Pat. No. 5,083,732 to Akamine discussed above.

Foreign Patent Application Publication No. JP10078194 to Kawaguchi Yoshinaga discloses a flexible magnifier. Note that this flexible magnifier is incapable of being attached to a hand-held electronic device with a screen at or below the eye level of a user.

Foreign Patent Application Publication No. JP2006119554 to Komada Mitsuharu discloses a camera fixture. The camera is screwed into the camera fixture device is not held by a universal belt buckle attachment. This device does not attach to a hand-held electronic device with a screen at or below the eye level of a user.

Non-Patent Publication "TNB ACGPVELO36136 Boat and Bike Universal Support" at http://www.pixmania.co.uk/uk/uk/575225/art/tnb/acgpvelo36136-boat-and-bi.html discloses the details of the universal support. This universal is designed for use on a bike or in a boat. The ACG-PVELO36136 mount from "T'n'B" can be attached to any tube (handlebars or frame) to solidly keep your GPS or PDA in place and within hand's reach. Equipped with a modular knob and an anti-slide system for improved stability, this mount can be installed easily. It is compatible with tubes from 15 to 30 mm in diameter. The size of the base is from 4.2×2.5 cm to 10.8×6 cm. A gooseneck is not present in this device. This device only attaches to cylindrical tubes, not to a flat sheet such as an airplane dining tray. The device clamps a GPS or PDA in place and within hand's reach, but the screen of the device is not at or below the eye level of a user and the clamping action may damage sensitive electronics.

Non-Patent Publication "LED One Light Gooseneck Reading Lamp with Clamp in Polished Steel", located at the following website address: http://www.pixmania.co.uk/uk/uk/575225/art/tnb/acgpvelo36136-boat-and-bi.html, discloses the details of the LED lamp. This sleek desk lamp uses the latest LED technology. It will conveniently last for several thousand hours while saving energy! Its fully adjustable gooseneck body allows for precise task lighting. An in-line cord switch is provided. The device is permanently attached to the LED light and does not removably attach to a hand-held electronic device with a screen at or below the eye level of a user.

Non-Patent Publication "Panavise Universal Electronic Device" at http://www.pricecheck.co.za/offers/663382/Panavise+Univeral+Electtronic+Device+(ipo/ discloses the details of the universal holding device. This 12" UniFlex mount and Portable electronics holder is for Ipods, MP3 players, cell phones, etc. The holder features sure grip jaws plus adjustable width and length to accommodate buttons and data access ports. Jaws adjust from 1.16" (29.5 mm) to 2.5" (63.5 mm) and the length adjusts 1.4" (35.6 mm) to allow items to be placed in the jaws so they do not interfere with critical buttons on the sides. No tools are required to adjust the jaws to fit the device, and they open with a quick release button. Sure grip soft jaws protect and hold the device without scratching its surface. The UniFlex mount features a double wound shaft for maximum rigidity with the flexibility to handle difficult mounting situations. Heavy-duty, black vinyl coating protects the shaft. AMPS/NEC compatible and backed by a "lifetime warranty. A patented "pinch design" prevents the flex shaft from coming loose from the base or the head plate. The adjusting point under the mounting plate tilts 210, turns 360 and rotates 360 to maximize handset accessibility. The mount base can be mounted vertically or horizontally; shaft easily and securely screws into either configuration. Jaw-like heavy weight clamps are used to secure the hand-held electronic device with a screen at or below the eye level of a user in a vertical orientation. This type of clamp may easily damage the electronics of the handheld electronic device.

Non-Patent Publication "Macally IceCam Portable Goose Neck USB video web camera" at http://www.pcdeli.co.uk/?page=proddetail&prod=19031 discloses the details of the USB web camera. The Macally IceCam is a light, portable USB video web camera. It works with Yahoo! Messenger and iChatAV, etc. Macally IceCam connects to internet Video and provides Image Capture. The focus is adjustable. A flexible cable design is provided for easy height and angle positioning. The status of the Ice cam is indicated by a built-in status LED indicator. A USB camera on the first end has an LED indicator. There is a USB connection plug on the other end. The stiff wire is wound in the form of a helical spring. This device does not attach to a hand-held electronic device with a screen at or below the eye level of a user, and is not secured to a flat sheet surface of an airplane dining tray or worktable.

Non-Patent Publication "ARKON-SF-240-Portable DVD Flexible Gooseneck Mount" at http://www.electronicsoutfitter.com/sf-240/arkon/p137394.html discloses the details of the gooseneck mount for portable DVDs. The 15" flexible gooseneck provides for easy adjustment and easily installs to a seat track to hold onto the passenger side seat. The mount does not attach to a hand-held electronic device with a screen at or below the eye level of a user, and is not attached to flat sheet such as an airplane dining tray or worktable. A flat surface receives a DVD, and the complex attachment for secures the device to the seat track.

Notwithstanding the efforts of prior art workers there does not exist a secure attachment device for a hand-held electronic with a screen at or below at the eye level of a user. Neither does there exist an attachment device that is usable in various locations including disposition with an airline dining tray or a workbench. Accordingly, there exists a need for a holding device that securely holds the handheld electronic device at or below the eye level of the user without unpredictable displacement, while the hand-held electronic device with a screen securing means remains firm, yet gentle enough to prevent damage to the electronics, which typically include a hard drive present within the hand-held electronic screen-containing device.

SUMMARY OF THE INVENTION

The present invention provides a hands-free device holder that attaches to a handheld electronic screen-containing device at or below the eye level or lower of a user. The attachment is accomplished using a lightweight universal belt clip. The universal belt clip is secured to the proximal end of a flexible gooseneck so that the orientation of the display-containing, hand-held electronic device at or below the eye level of a user may be adjusted according user preferences. The distal end of the gooseneck is connected to a spring-loaded clip that may be readily attached to an airplane dining tray or work bench end. The overall weight of the hand-held electronic screen containing device with a universal belt clip attachment does not exert sufficient force on the spring-loaded clip. This is the case even when the gooseneck is bent and extended from the clip, resulting in the application of a torque that allows secure attachment and viewing of a hand-held electronic screen-containing device at or below the eye level of a user.

Handheld electronic devices have been providing an ever increasing level of features, and their size and weight has been shrinking. For example, Ipod generation 3 supports video features in addition to MP3 music playback. This device requires the Ipod screen to be present at or below the eye level of the user, the optimum distance typically ranging from 20 to 30 centimeters from the eye. An Iphone goes a step further in that all the functionality of the device is presented as screen displayed buttons that enable selection of each of the features. Other manufactures have followed the lead of the Ipod and Iphone. Competing products are marketed by Samsung and Sony, for example. More recently Google has collaborated with Magellan to create Magellan Maestro Elite 5340+GPRS, a GPS device that interacts live with the Google search engine, providing up-to-date local information. Most GPS units also provide MP3 music playback and display of photographs. Cell phones are provided with GPS navigation capabilities. All these devices are of different sizes. Consequently, and a holding device must work satisfactorily with each of these devices.

The present invention uses a securing means, which includes a pocket having two slot apertures at each edge. The securing means is attached to the handheld electronic device. This securing means may include a capture element appropriately sized according to the size of the hand-held electronic device with a screen secured thereto. The securing means may include a flat sheet with a belt attachment, or simply be secured using a double sided tape arrangement. The securing means pocket is preferably adapted to receive a snap type belt clip with spring loaded pins.

The hands-free device holder comprises, in combination, a plurality of elements having the features set forth below:

a) a flexible gooseneck having a proximal end and a distal end;

b) the proximal end having a tab with two spring-loaded pins that engage with lateral slots of a pocket member defining a universal belt coupler;

c) said pocket member being secured to the backside of a handheld electronic device by an appropriately sized capture element, a flat sheet with belt attachment means or use of a double edged tape;

d) the distal end of flexible gooseneck having a securing clip that resembles a spring-loaded cloth line like clip for securing the hands-free device holder to an airplane dining tray or worktable;

whereby the position of the handheld electronic device screen is adjusted to be at or below the eye level of the user by adjusting the flexible gooseneck, and the overall weight of the device in combination with a buckle attachment is insufficient to overcome the spring force of the distal end clip securing the device, providing hands-free operation for the handheld electronic device.

BRIEF DESCRIPTION OF THE DRAWINGS

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
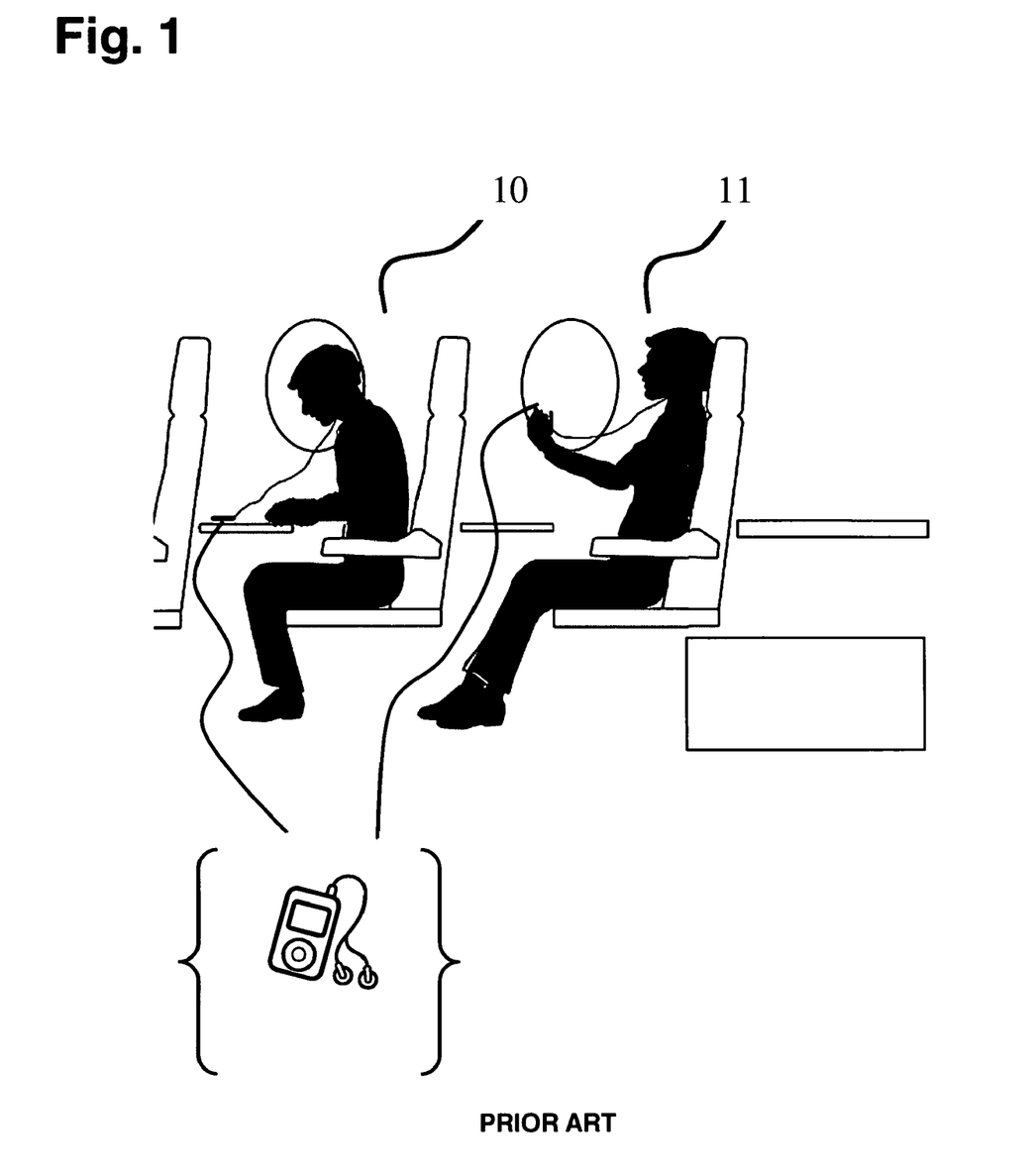
FIG. 1 illustrates a prior art holder for electronic devices.

These days an ever increasing number of people carry electronic devices. When wireless, such devices allow the user to watch movies, television programs or other forms of media during travel to remote locations. The devices are sold under the Trademarks IPhone® and IPod® by the company Apple®, and under the Trademark PSP® by the company Sony®. When thus sold as PDA's, and the like, the devices have small encasements and screens. Problems encountered by prior art workers when viewing these screens while traveling are illustrated in FIG. 1. Users will typically either place the device down on their lap or tray table, as shown at 10, or hold the device in their hands, as shown at 11, so they can see the screen. When placing the device on the lap or table 10, the user must arch his/her back and neck, straining these muscles, to accommodate a bad viewing angle that is not ergonomically conducive. Such placement of the screen and positioning of the viewer with respect thereto heightens the risk that the device will be dropped or will fall. Conversely, when the user holds the device in his/her hands 11, the user's arm tends to become tired and experience loss of circulation. Such usage restricts use of the hands, leaving the user but one free hand to attend to other tasks. The Hands-Free Device Holder solves those problems associated with holding or propping-up cell phones, PDA's and other electronic devices. A hands-free ergonomic design allows the device to be secured and the screen adjusted to a comfortable viewing angle, while facilitating the use of both hands.

Figures 2, 2A:
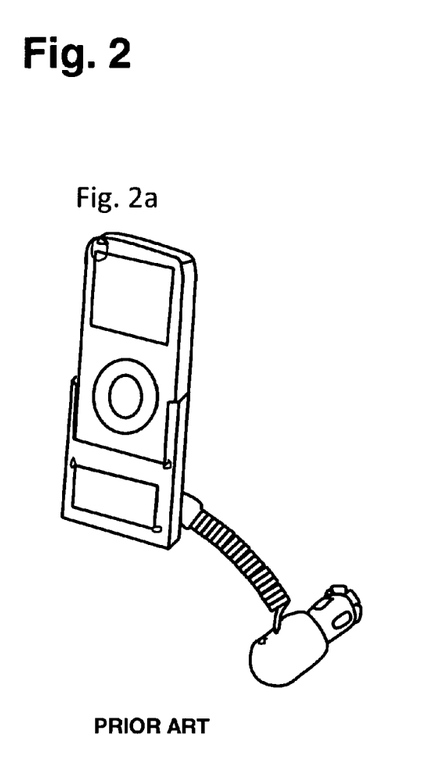
FIGS. 2a, 2b and 2c illustrate a prior art holder for MP3 and cell phone devices.
Figure 2B:
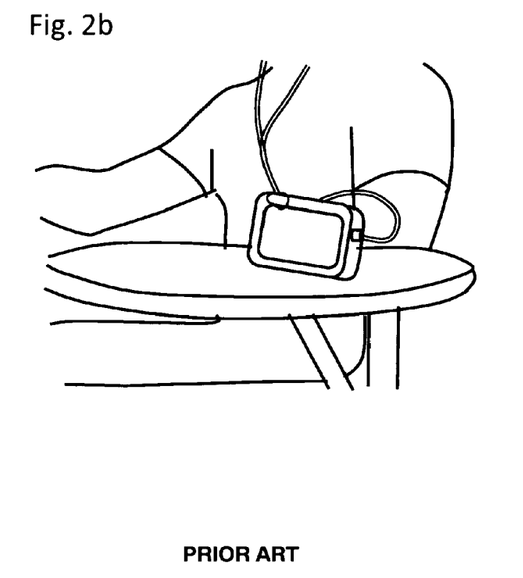
Figure 2C:
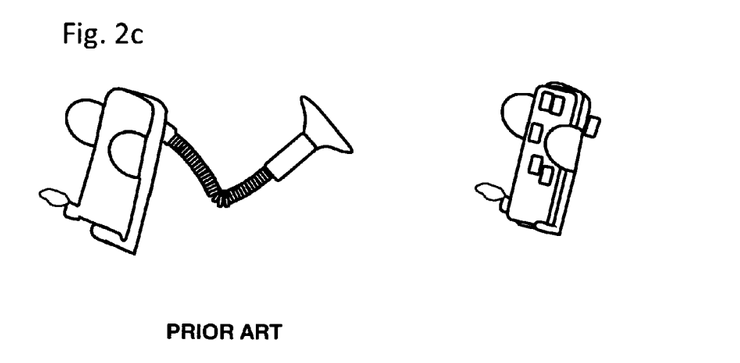

Various devices disclosed by prior art workers provide cradled support stations and the like for use of the personal electronic device/phone in automobiles. FIGS. 2a, 2b and 2c, illustrate prior art automobile docking cradled support stations. For example, the device of FIG. 2a, as disclosed in U.S. Pat. No. 7,292,881, is appointed to provide power to the electronic device through an adapter plugged into a cigarette lighter. The tubular connection between the cigarette lighter and the electronic device has a fixed distance, and is not adjustable to bring the screen of the electronic device to a location within the visibility range of the user. The cigarette lighter provides power to the IPod and an RF transmitter that sends an FM or AM signal at a selected preset frequency, so that the Ipod music may be received through a car radio. FIG. 2b illustrates a frame that is provided to hold the electronic device at an angle of incline on a table. However, the device illustrated is not usable from a multitude of viewing angles, and is not adjustable to suit a viewer's needs to view the contents of the screen displayed. The device of FIG. 2c is adapted to provide a cradle for an Iphone. The cradle utilizes a suction cup for securing the holding device to a glass or non-porous surface, such as a land vehicle windshield. It is provided with an encasement for holding the electronic device. The cradle does not attach to an airline dinner tray or a work bench. There remains a need in the art for a virtually hands-free and ergonomically designed personal electronic device holder that can be adjusted to a plethora of positions and angles so that a user can comfortably view the screen of the electronic device without sacrificing comfort or straining his/her body. There is also a need for a device that positions the screen of the electronic device at or below eye level of the user at an approximate distance of 20 to 30 centimeters from the eyes, and wherein the position of the screen is relatively stable and free from vibrations or movements.

Figure 3:
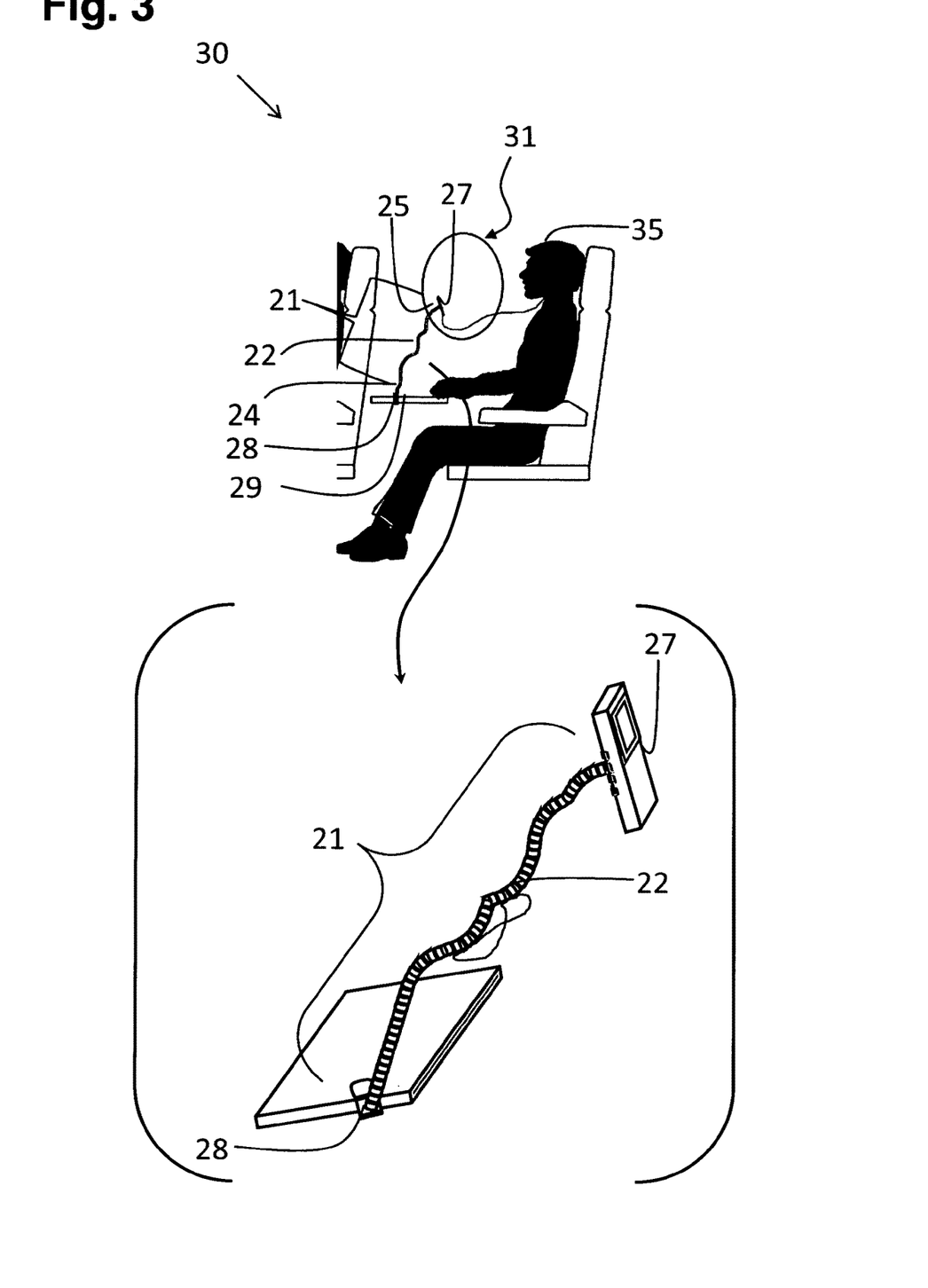
FIG. 3 illustrates a holding device for securing a portable electronic handheld unit with a screen according to the subject invention attached to an airline dinner tray.
Figure 4:
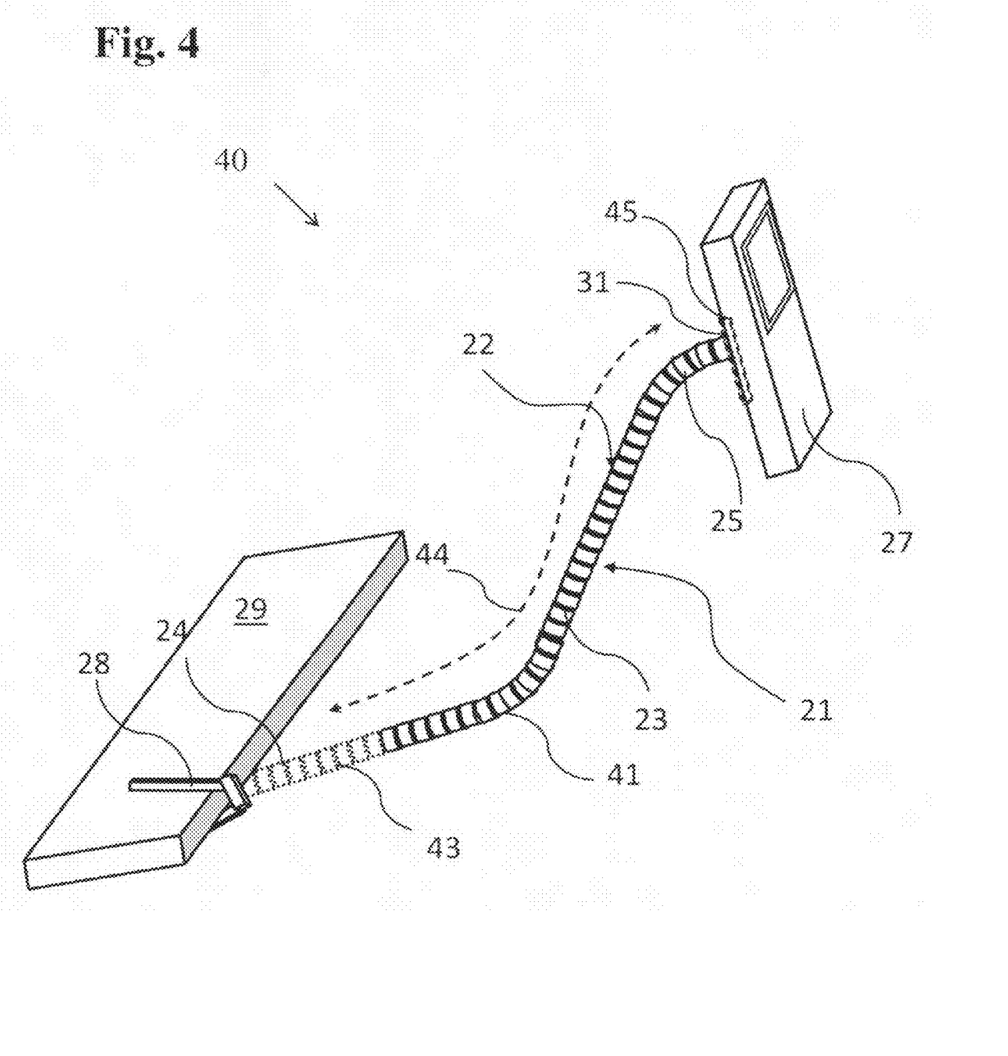
FIG. 4 illustrates the details of the holding device for securing the portable electronic handheld unit.
Figure 5:
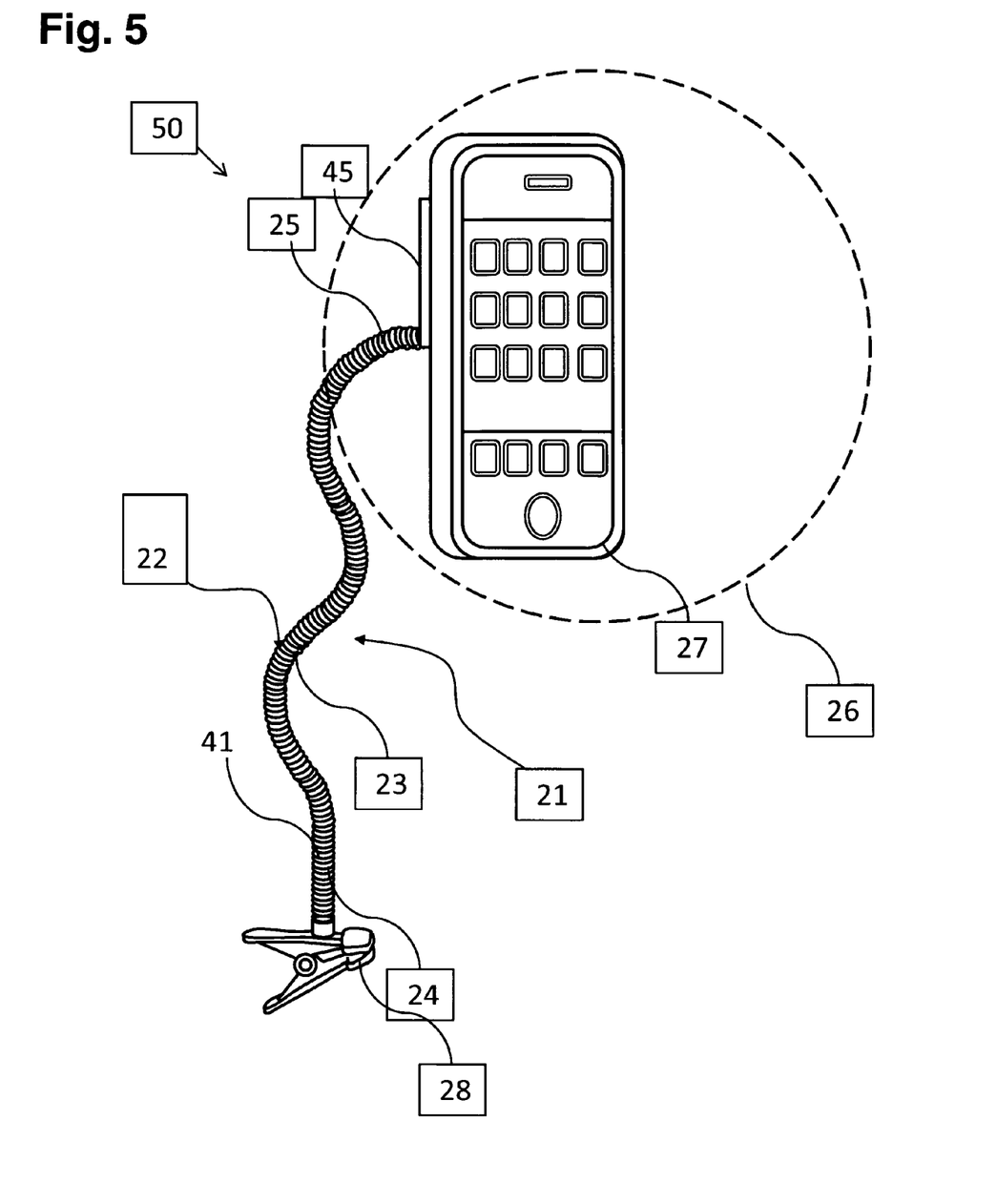
FIG. 5 shows a photograph of an Iphone secured to the holding device of the subject invention.

FIG. 3 illustrates at 30 a schematic view of the hands-free device holder of the subject invention utilized on a train, bus or an airplane dining tray; FIG. 4 illustrates at 40 a drawing of the hands-free device holder and FIG. 5 illustrates at 50 a photographic view of the hands-free device holder, shown holding an Iphone. Referring to FIGS. 3, 4 and 5, hands-free device holder 21 comprises a flexible shaft 22 having a central section 23 extending between a distal end 24 and a proximal end 25. Flexible shaft 22 is comprised of flexible jointed spines 41 so that central section 23 of flexible shaft 22 can be deformed and maintain a position for comfortably viewing the screen of a personal electronic device 27 by a user 35. Flexibility and distortion of flexible shaft 22 is accomplished by the user positioning flexible jointed spines 41 as indicated by phantom arrow 44 (shown in FIG. 4). Distal end 24 of flexible shaft 22 includes a distal securing means 28 associated therewith for removable attachment to a surface 29, herein shown as a tray table on a train or airplane. Proximal end 25 of flexible shaft 22 includes a proximal securing means 31 associated therewith for removable attachment to personal electronic device 27.

Handheld electronic device proximal securing pocket 45 is provided as a universal belt clip, which is appointed for mating connection with the proximal securing means 31. This pocket 45 has two apertures and is secured to the handheld electronic device such as an Ipod, Iphone, GPS, PDA or other device. The securement of the pocket 45 to the hand-held portable electronic device may be achieved by a tight-fitting member that is sized properly, or a flat surface of the pocket associated with a belt attachment or by a double edged tape which, as shown in FIG. 4, stays with the handheld electronic device. This pocket may also be used to connect the handheld electronic device to the belt of the user, provided a securing tab similar in construction to 31 is provided in the belt. In this manner, proximal securing means 31 will act as a universal holder for an array of devices utilizing the belt clip/existing clips. Snap-on type proximal securing means 31 may be provided. Distal securing means 28 is preferably provided as a universal clip, such as a "clothes pin" style or clamp, expanding from 0"-2.5" to attach to virtually any object, such as tray 29. Distal securing means 28 is lightweight, preferably plastic, and may include rubber padding for enhanced stability and to protect surfaces to which it is to attach. Flexible shaft 22 is thin, but sturdy, and flexible jointed spines 41 are preferably composed of metal or a lightweight, durable plastic material. Flexible shaft 22 and vis-a-vis flexible jointed spines 41 flex to adjustable angles and height, and operate as gooseneck cords commonly utilized for personal lamps and the like. Distal end 24 of flexible shaft 22 is screwed or removably attached to distal securing means 28. Proximal end 25 of flexible shaft 22 is screwed, snapped or otherwise removably attached to proximal securing means 31, and provides adoption so that different device holders can be attached thereto. The length of the flexible shaft 22 preferably ranges from 18"-24".

A coating or rubber encasement 43 (in FIG. 4), shown partially covering a portion of the flexible shaft 22 and some of the flexible jointed spines 41, may be included over flexible jointed spines 41 of flexible shaft 22 to provide aesthetic features, afford protection to the flexible jointed spines 41, and prevent particles from lodging therein or other damage from occurring.

Figure 6:
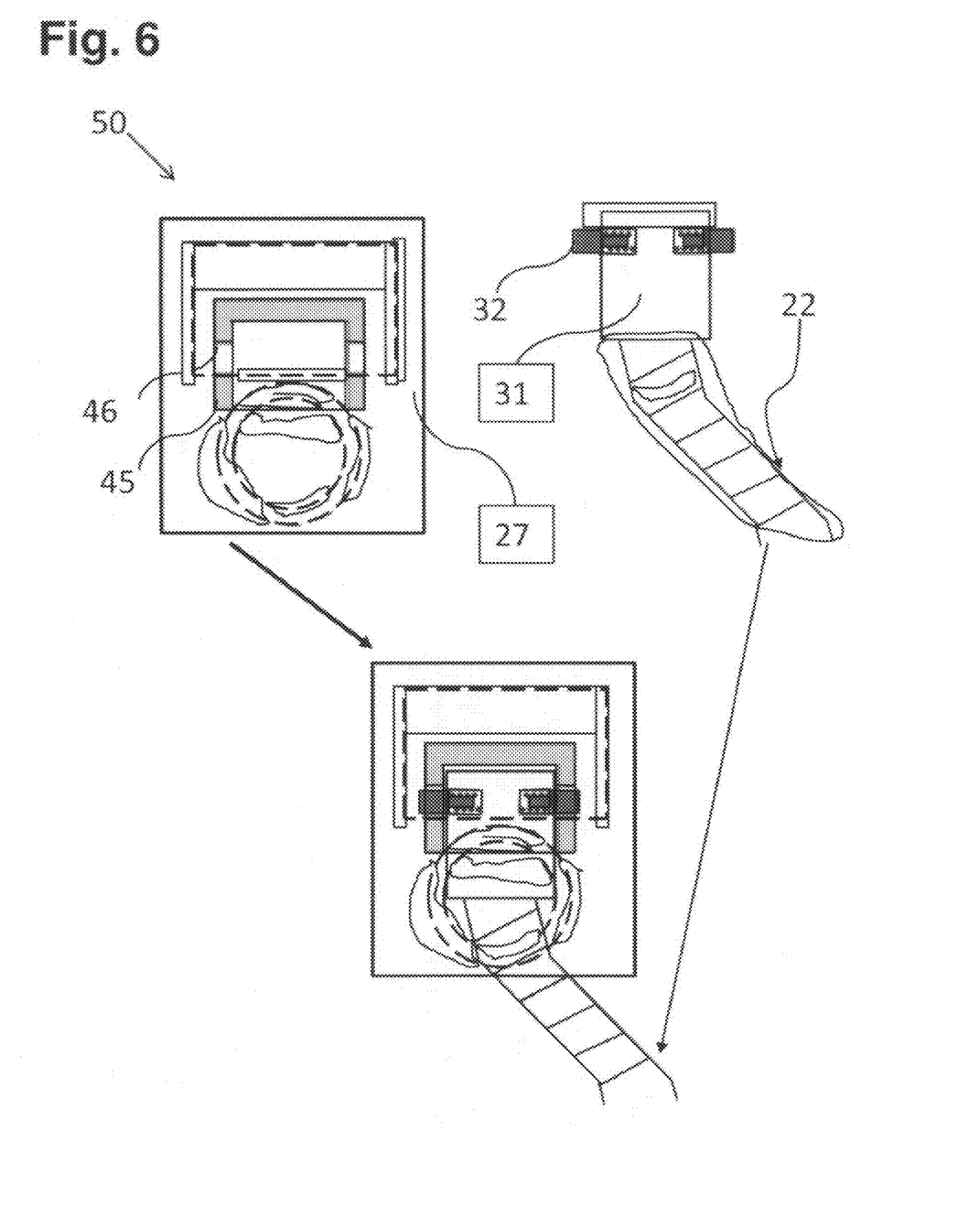
FIG. 6 illustrates the details of the securing means that attaches the gooseneck of the holding device to an Ipod using a universal belt clip.

The detail of the proximal securing clip 31 that is attached to the flexible gooseneck shaft 22 is illustrated at 50 in FIGS. 5 and 6. A plastic encasing pocket member 45 as shown in FIG. 5 is first attached to the handheld electronic device 27. FIG. 6 illustrates a pocket securing means that uses double edge tape attachment to the hand-held portable electronic device with a screen. The pocket member 45 is provided with two apertures 46, for receiving the spring-loaded pins 32 of the securing clip 31. These pins 32 are compressed first and thereafter inserted into the pocket member 41. The handheld electronic device 27 may be removed at any time from the flexible gooseneck shaft 22 by pressing the spring loaded clips 32 and pulling out the securing clip 31.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A hands-free electronic device holder, comprising:
   a. a pocket member with two lateral slots attached to the backside of a handheld electronic device by device securing means;
   b. a flexible gooseneck having a proximal end and a distal end;
   c. said proximal end of said flexible gooseneck having a tab with two spring loaded pins on either side for engaging with lateral slots of said pocket member, creating a buckle attachment in the form of a universal belt coupler configuration;
   d. said distal end of said flexible gooseneck having a spring loaded securing clip in a configuration resembling a cloth line clip;
   whereby the position of the handheld electronic device screen is adjusted to be at or below the eye level of the user by adjusting the flexible gooseneck, and the overall weight of the device in combination with the buckle attachment is insufficient to overcome the spring force of said distal end clip securing the device, providing hands-free operation of the handheld electronic device.

2. The hands-free electronic device holder as recited by claim 1, wherein the device securing means of the pocket member is a tight-fitting encasement attachment.

3. The hands-free electronic device holder as recited by claim 1, wherein the device securing means of the pocket member is a belt attachment.

4. The hands-free electronic device holder as recited by claim 1, wherein the device securing means of the pocket member is a double-taped attachment.

5. The hands-free electronic device holder as recited by claim 1, wherein the handheld electronic device is a MP3 player including an Ipod.

6. The hands-free electronic device holder as recited by claim 1, wherein the handheld electronic device is a multi-functional cell phone, including an Iphone.

7. The hands-free electronic device holder as recited by claim 1, wherein the handheld electronic device is a PDA including a Blackberry.

8. The hands-free electronic device holder as recited by claim 1 wherein said flexible gooseneck comprises a plurality of flexible jointed spines.

9. The hands-free electronic device holder as recited by claim 1, wherein said flexible gooseneck has a coating of rubber encasement.

10. The hands-free electronic device holder as recited by claim 1, wherein said tab is attached to said flexible gooseneck by a screwed connection.

11. The hands-free electronic device holder as recited by claim 1, wherein said flexible gooseneck has a coating of rubber encasement.

12. The hands-free electronic device holder as recited by claim 1, wherein the distance between the screen of said handheld electronic device and a user's eyes is in the range of 20 to 30 centimeters.

* * * * *